United States Patent
Reid et al.

(10) Patent No.: US 10,166,640 B2
(45) Date of Patent: Jan. 1, 2019

(54) RECONFIGURABLE FLEXIBLE RAIL METHOD

(71) Applicant: The Boeing Company, Chicago, IL (US)

(72) Inventors: Eric M. Reid, Bothell, WA (US); Alan R. Merkley, Greenbank, WA (US); James C. Murphy, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 51 days.

(21) Appl. No.: 15/060,721

(22) Filed: Mar. 4, 2016

(65) Prior Publication Data
US 2016/0256972 A1    Sep. 8, 2016

Related U.S. Application Data

(62) Division of application No. 12/192,248, filed on Aug. 15, 2008, now abandoned.

(51) Int. Cl.
*B23Q 9/00* (2006.01)
*B64F 5/10* (2017.01)

(52) U.S. Cl.
CPC ......... *B23Q 9/0042* (2013.01); *B23Q 9/0007* (2013.01); *B64F 5/10* (2017.01); *B23Q 2210/008* (2013.01); *Y10T 29/51* (2015.01)

(58) Field of Classification Search
CPC .............. B23Q 9/0042; B23Q 9/0007; B23Q 2210/008; B64F 5/10; Y10T 29/51
USPC ..... 409/178, 179; 29/34 B, 560; 408/95, 97, 408/98
See application file for complete search history.

(56) References Cited

U.S. PATENT DOCUMENTS

| | | | |
|---|---|---|---|
| 480,040 | A | 8/1892 | Saylor |
| 2,238,304 | A | 4/1941 | Belanger |
| 2,921,492 | A | 1/1960 | Worth |
| 3,259,021 | A | 7/1966 | Appleton et al. |
| 3,354,784 | A | 11/1967 | Zemberry |
| 3,456,555 | A | 7/1969 | Dunlap |
| 3,575,364 | A | 4/1971 | Frederick |
| 4,297,061 | A | 10/1981 | Wolfe et al. |
| 4,422,384 | A | 12/1983 | Johnson et al. |

(Continued)

FOREIGN PATENT DOCUMENTS

| | | |
|---|---|---|
| EP | 1563950 A1 | 8/2005 |
| JP | 2007526134 A | 9/2007 |
| WO | 2008091314 A1 | 7/2008 |

OTHER PUBLICATIONS

PCT Search and Written Opinion for PCT/US2009/048294 dated Oct. 21, 2009.

(Continued)

*Primary Examiner* — Jason L Vaughan
(74) *Attorney, Agent, or Firm* — Yee & Associates, P.C.

(57) ABSTRACT

A method and apparatus for performing operations on a work piece comprises a flexible rail system and a multi-axis carriage. The flexible rail system may be capable of being attached to a work surface. The multi-axis carriage may be coupled to the flexible rail system. The multi-axis carriage may be capable of moving along the flexible rail system and may be capable of moving a tool in axes relative to the work surface. The tool may be single use or multi use and may be removably coupled to the frame and or carriage.

19 Claims, 17 Drawing Sheets

(56) References Cited

U.S. PATENT DOCUMENTS

| | | | |
|---|---|---|---|
| 4,485,453 A | 11/1984 | Taylor | |
| 4,538,946 A | 9/1985 | Bloch | |
| 4,599,018 A | 7/1986 | Woods | |
| 4,752,160 A | 6/1988 | Murray et al. | |
| 4,850,763 A | 7/1989 | Jack et al. | |
| 4,885,836 A | 12/1989 | Bonomi et al. | |
| 5,028,179 A * | 7/1991 | Grasset | B23C 3/126 144/154.5 |
| 5,044,075 A | 9/1991 | Brennan et al. | |
| 5,044,844 A * | 9/1991 | Backhouse | B23Q 9/0021 409/178 |
| 5,161,291 A | 11/1992 | Guenther | |
| 5,323,962 A | 6/1994 | Jassby et al. | |
| 5,403,133 A | 4/1995 | Kim | |
| 5,562,043 A | 10/1996 | Gromes | |
| 5,661,892 A | 9/1997 | Catania et al. | |
| 5,697,413 A | 12/1997 | Fuller | |
| 5,740,847 A | 4/1998 | Lakso | |
| 5,848,859 A | 12/1998 | Clark et al. | |
| 5,848,930 A | 12/1998 | Jones | |
| 5,876,161 A | 3/1999 | Ikola et al. | |
| 6,033,166 A | 3/2000 | Hampel | |
| 6,073,326 A | 6/2000 | Banks et al. | |
| 6,098,260 A | 8/2000 | Sarh | |
| 6,158,666 A | 12/2000 | Banks et al. | |
| 6,467,385 B1 | 10/2002 | Buttrick et al. | |
| 6,494,307 B1 * | 12/2002 | Kozak | B23Q 1/58 105/29.1 |
| 6,843,328 B2 | 1/2005 | Boyl-Davis et al. | |
| 6,905,291 B2 | 6/2005 | Day et al. | |
| 6,926,094 B2 | 8/2005 | Arntson et al. | |
| 6,966,731 B2 | 11/2005 | VanderPol et al. | |
| 7,112,018 B2 | 9/2006 | Boyl-Davis et al. | |
| 7,131,898 B2 | 11/2006 | Adkins et al. | |
| 7,134,649 B2 | 11/2006 | Boyl-Davis et al. | |
| 7,137,760 B2 | 11/2006 | Boyl-Davis et al. | |
| 7,165,300 B2 | 1/2007 | Phillips et al. | |
| 7,165,630 B2 | 1/2007 | Arnston et al. | |
| 7,216,408 B2 | 5/2007 | Boyl-Davis et al. | |
| 7,264,426 B2 | 9/2007 | Buttrick, Jr. | |
| 7,269,894 B2 | 9/2007 | Day et al. | |
| 7,270,505 B2 | 9/2007 | VanderPol et al. | |
| 7,273,333 B2 | 9/2007 | Buttrick et al. | |
| 7,380,776 B2 | 6/2008 | Boyl-Davis et al. | |
| 7,384,220 B2 | 6/2008 | Clark | |
| 7,406,758 B2 | 8/2008 | Jones et al. | |
| 7,488,144 B2 | 2/2009 | Boyl-Davis et al. | |
| 7,494,306 B2 | 2/2009 | Sihmada | |
| 7,578,642 B2 | 8/2009 | Fritsche et al. | |
| 7,621,206 B2 | 11/2009 | Makropoulos | |
| 7,677,846 B2 | 3/2010 | VanderPol et al. | |
| 2002/0168241 A1 | 11/2002 | David et al. | |
| 2004/0265077 A1 | 12/2004 | Boyl-Davis et al. | |
| 2005/0265798 A1 | 12/2005 | Boyl-Davis et al. | |
| 2006/0032035 A1 | 2/2006 | Phillips et al. | |
| 2007/0036618 A1 | 2/2007 | Fritsche et al. | |
| 2010/0037444 A1 | 2/2010 | Reid et al. | |

OTHER PUBLICATIONS

Office Action, dated Jun. 15, 2012, regarding U.S. Appl. No. 12/192,248, 28 pages.
Final Office Action, dated Oct. 25, 2012, regarding U.S. Appl. No. 12/192,248, 19 pages.
Japanese Patent Office Notice of Reasons for Rejection, English translation only, dated Aug. 13, 2013, regarding Application No. 2011-523016, 2 pages.

* cited by examiner

RECONFIGURABLE FLEXIBLE RAIL METHOD

This application is a divisional application of U.S. patent application Ser. No. 12/192,248, filed Aug. 15, 2008.

BACKGROUND INFORMATION

1. Field

The present disclosure relates generally to manufacturing and in particular to manufacturing tools and automation. Still more particularly, the present disclosure relates to rail mounted tools used for manufacturing.

2. Background

Manufacturing aircraft may involve aligning different components on structures and/or other components. Holes may be drilled through these aligned parts to prepare for attaching the parts to each other. The parts may be attached using fasteners such as, for example, without limitation, rivets, screws, bolts, and other suitable fasteners. The creation of these holes may be performed manually or through machine tools.

These machine tools may comprise a robotic apparatus that may move with respect to the aligned parts and drill the desired holes. These types of tools often may require substantial floor space and large investment costs, and may have limits on efficiency because these types of tools may only drill one hole at a time. Further, the amount and/or types of work that may be performed using these types of tools may be reduced based on required safety zones.

Other types of machine tools include smaller flexible tools, such as, for example, without limitation, tools on flexible rails. These types of tools may include rails attached to the parts. For example, with the fuselage, a rail system may be attached to the fuselage with a drilling tool moving along the rail to drill the desired holes. These types of flexible rail systems may provide lower equipment and implementation costs. Further, these types of systems also may provide for quicker setup time and the capability to drill holes with many types of surface contours.

Currently available rail systems may take the form of a dual rail system. With the dual rail system, attaching and maintaining the rails using a parallel configuration with desired offset dimensions between the rails may be difficult depending on the curvature of the surface of the object on which drilling operations may be performed.

Further, after a drilling operation has been performed, a sealant and/or fasteners may be applied to the holes used to fasten components to each other. This type of operation may require removing the rails and the unit and placing a new set of rails and unit onto the fuselage. In some systems, the old unit may be moved off the rail and a new unit with the appropriate tool may be coupled to the rail. This type of process may be time consuming, as well as more costly by duplicating rail systems and/or units for different operations.

Accordingly, a need is present for a method and apparatus for minimizing the limitations discussed above.

SUMMARY

The advantageous embodiments of the present invention may provide a method and apparatus for performing operations on a work piece. In one embodiment, an apparatus may comprise a flexible rail system and a multi-axis carriage. The flexible rail system may be capable of being attached to a work surface. The multi-axis carriage may be coupled to the flexible rail system. The multi-axis carriage may be capable of moving along the flexible rail system and may be capable of moving a tool in axes relative to the work surface.

In another advantageous embodiment, an apparatus may be present for performing operations on a work piece. A flexible vacuum rail may be capable of being attached to a curved work surface of the work piece. A multi-axis carriage may be removably coupled to the flexible rail system. The multi-axis carriage may be capable of moving along the flexible rail system and may be capable of moving a tool in axes relative to the curved work surface. The multi-axis carriage may comprise a first motor capable of moving the multi-axis carriage on the flexible rail along an X-axis in the axes. A second motor may be capable of moving the tool in the tool module along a Y-axis in the axes. A tool module may be capable of being removably coupled to the multi-axis carriage and may comprise a frame. The tool may be mounted on the frame. The tool may be located on a first side of the tool module. The tool may be selected from at least one of a drill, a measurement probe, a rivet hammer, a router, a trimming saw, a grinding wheel, and a fastener. A pressure foot may be located on the first side and may be capable of applying pressure to the curved work surface. The pressure foot may be rotatable about an A-axis parallel to the X-axis, and may be capable of providing a force that is normal to the curved work surface. A reaction unit may be located on a second side of the tool module, and may be capable of stabilizing the multi-axis carriage during operation of the tool and while the multi-axis carriage moves along the flexible rail. The reaction unit may comprise at least one of a set of fixed feet and a set of rollers.

In yet another advantageous embodiment of the present invention, a method is present for performing an operation on a work piece. A vacuum rail may be attached with a multi-axis carriage removably coupled to the vacuum rail to a surface of a work piece. A tool module may be coupled to the multi-axis carriage. The tool module may have a tool capable of performing the operation. The multi-axis carriage may move along the flexible vacuum rail to a location on the work piece. The operation may be performed at the location.

In still yet another advantageous embodiment, a method for performing an operation on an aircraft work piece may comprise a flexible vacuum rail, and a tool module. The flexible vacuum rail with a multi-axis carriage removably coupled to the flexible vacuum rail may be attached to a surface of the aircraft work piece. The tool module may be coupled to the multi-axis carriage and may have a tool capable of performing the operation. The multi-axis carriage may move along the flexible vacuum rail to a location on the aircraft work piece. A force may be applied against the surface with a pressure foot located on a first side of the tool module. The pressure foot may be rotatable around an axis parallel to an axis of movement of the multi-axis carriage. The force may be normal to the surface. A reactive force may be provided to the force with a reactive unit located on a second side of the tool module. The operation may be performed after the force and the reactive force are applied. The operation may be selected from at least one of a drilling operation and a fastening operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims.

The advantageous embodiments, however, as well as a preferred mode of use, further objectives and advantages thereof, will best be understood by reference to the following detailed description of an advantageous embodiment of the present disclosure when read in conjunction with the accompanying drawings, wherein.

DETAILED DESCRIPTION

Figure 1:
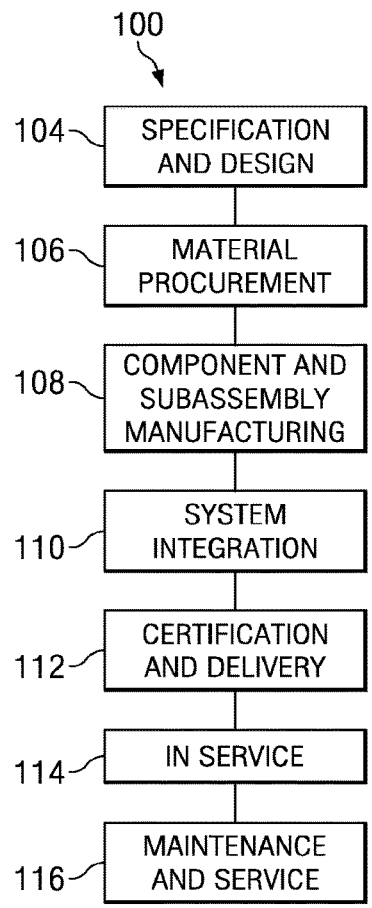
FIG. 1 is a flow diagram of an aircraft production and service methodology in which an advantageous embodiment may be implemented.
Figure 2:
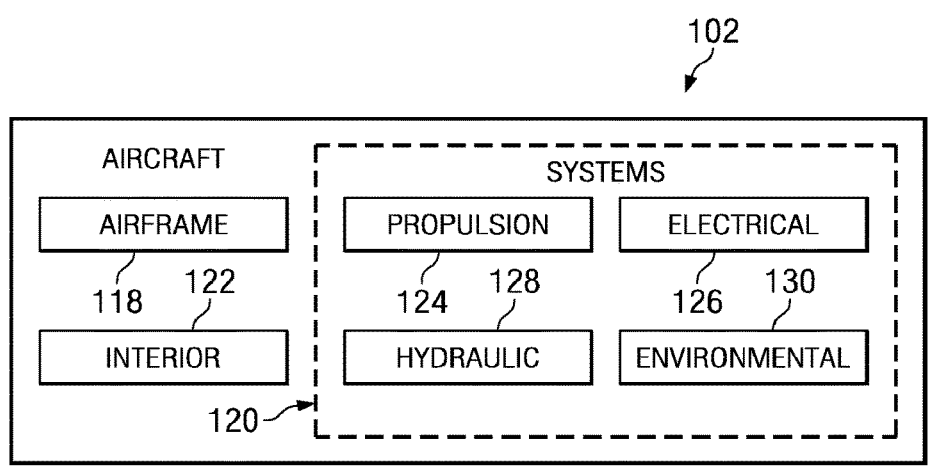
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and an aircraft 102 as shown in FIG. 2. During preproduction, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, for example, without limitation, any number of aircraft manufacturers and major-system subcontractors; a third party may include, for example, without limitation, any number of venders, subcontractors, and suppliers; and an operator may be, for example, without limitation, an airline, leasing company, military entity, service organization, or other suitable entity.

As shown in FIG. 2, aircraft 102 produced by aircraft manufacturing and service method 100 may include airframe 118, a plurality of systems 120, and interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116.

The different advantageous embodiments recognize and take into account that currently available flexible rail systems may still have limitations that may be undesirable. The different advantageous embodiments recognize and take into account that currently available rail systems may be dual rail systems. With a dual rail system, applying and maintaining the rails on a parallel configuration with desired offset dimensions between the rails may be difficult, especially when complex contours are present.

Further, the different advantageous embodiments recognize that currently available positioning drilling units are integrated as a single unit. In other words, the tool may be integrated as part of the unit that travels on the rail. As a result, when changes in the types of tools are required, additional setup time may be needed. Further, by changing the entire unit, the different advantageous embodiments recognize and take into account that duplication of components may be required, increasing the expense of maintaining tools.

For example, when performing operations on a work piece such as, for example, without limitation, a fuselage, a set of holes may be drilled into the fuselage. Next, sealant may be applied to the countersink area of the hole, and fasteners may be used to fasten components in the fuselage to each other. This type of operation may require changing the entire unit. This type of change may require removal of the rails and placement of new rails and a new unit onto the fuselage. In other types of dual rail systems, the unit may be moved off of the rails and a new unit with the appropriate tool may be coupled to the rails. This type of operation may be time-consuming as well as more costly by requiring duplicate rail systems and/or multiple units for different operations.

Further, even with performing drilling operations, a particular drill may be dedicated for a selected range of drilling parameters based on spindle design. If desired drilling parameters fall out of the selected range, a different drill may be required. As a result, multiple units with drills having different ranges of drilling parameters may be required. Changing a drill may require moving the unit from the track and replacing the carriage with a new unit. The unit may then be moved back to the desired position and the operations may begin. This type of removal and replacement of the unit may require time, increasing the time needed to complete manufacturing of a component.

Thus, the different advantageous embodiments provide a method and apparatus for performing operations on work pieces. In one advantageous embodiment, a flexible rail system may be capable of being attached to a work surface of a work piece. A multi-axis carriage may be coupled to the flexible rail system. The multi-axis carriage may be capable of moving along the flexible rail system and may be capable of moving a tool in axes relative to the work surface. A tool module may be removably coupled to the multi-axis carriage. In this manner, the changing of tools may be quickly performed without requiring removing and replacement of the carriage. Further, the different advantageous embodiments also may provide a capability to employ a flexible rail system with a single rail.

A reaction unit may be used to stabilize a multi-axis carriage during movement of the multi-axis carriage along the flexible rail. Further, this reaction unit also may be capable of stabilizing the multi-axis carriage during operation of the tool. In other advantageous embodiments, the tool module may include a capability to move or rotate the tool about an A-axis to maintain a capability to drill a hole normal to the surface of the work piece.

Figure 3:
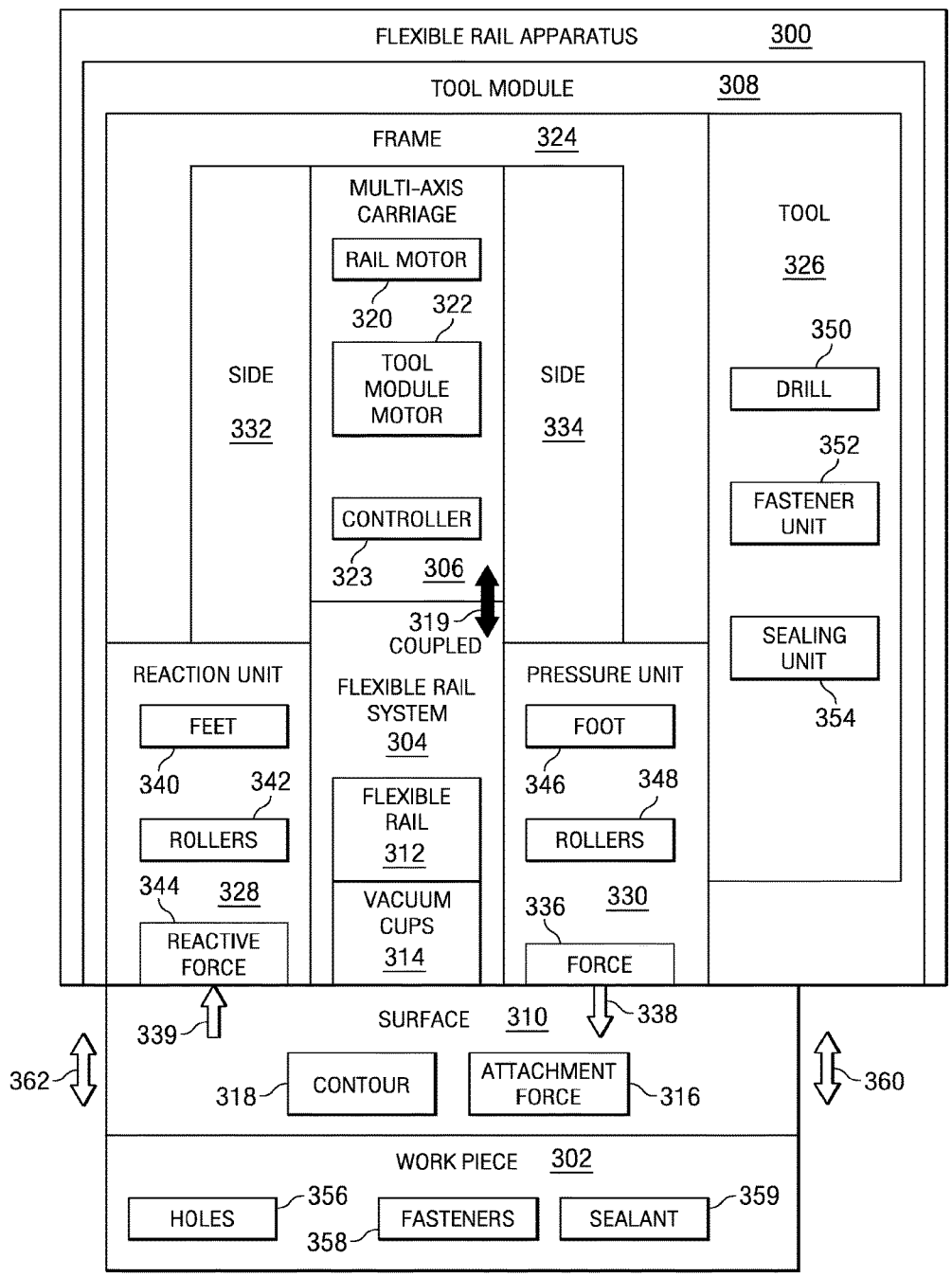
FIG. 3, a block diagram of a flexible rail apparatus in accordance with an advantageous embodiment.

With reference now to FIG. 3, a block diagram of a flexible rail apparatus is depicted in accordance with an advantageous embodiment. Flexible rail apparatus 300 is an example of an apparatus that may be used to perform operations on work piece 302. In these examples, work piece 302 may take various forms. For example, without limitation, work piece 302 may be a part, a subassembly, a system, or some other structure. Work piece 302 may be, for example, without limitation, multiple parts aligned to each other for an operation to be performed using flexible rail apparatus 300. Work piece 302 may be, for example, without limitation, a fuselage, a wing, a tail, an aircraft door, an aircraft empennage, an engine housing, an aircraft control surface, or some other suitable object.

Flexible rail apparatus 300 may include flexible rail system 304, multi-axis carriage 306, and tool module 308. Flexible rail system 304 may be removably coupled or attached to surface 310 of work piece 302. In these examples, flexible rail system 304 may be comprised of flexible rail 312, which may be attached to surface 310 of work piece 302 using vacuum cups 314. With flexible rail 312, flexible rail apparatus 300 may be attached to contour 318 in surface 310 of work piece 302. This contour may be, for example, without limitation, a curve in a fuselage. Contour 318 may be a complex and/or compound curve.

With use of flexible rail 312 by itself, problems with maintaining two or more rails parallel to each other with appropriate space settings may be avoided. Additionally, flexible rail 312 also avoids issues that may occur with dual rails that follow complex contours. These types of contours may result in undesirable stress on multi-axis carriage 306. Flexible rail apparatus 300 may also minimize positioning inaccuracies. Further, with the use of only flexible rail 312, less space, cost, and/or weight may be present in flexible rail apparatus 300.

Multi-axis carriage 306 may be coupled to flexible rail 312 as shown by arrow 319. Multi-axis carriage 306 may include rail motor 320, tool module motor 322, and controller 323. Rail motor 320 may move multi-axis carriage 306 along flexible rail 312. This movement may move multi-axis carriage 306 along an axis, for example, an X-axis. Tool module motor 322 may be used to move tool module 308 along an axis, for example, a Y-axis.

Controller 323 may control the movement and operation of flexible rail apparatus 300 with respect to work piece 302. Controller 323 may be, for example, without limitation, a computer, an application to a specific integrated circuit (ASIC), a control circuit, or some other suitable device.

In these illustrative examples, tool module 308 may be removably coupled to multi-axis carriage 306. Tool module 308 may include frame 324 and tool 326. Tool 326 may be mounted on frame 324. Additionally, tool 326 also may be removably mounted to frame 324, allowing tool 326 to be exchanged with another tool.

In this example, tool module 308 also may include reaction unit 328 and pressure unit 330. Reaction unit 328 may be located on side 332 of frame 324, while pressure unit 330 may be located on side 334 of frame 324. In this manner, reaction unit 328 and pressure unit 330 may be located opposite to each other on tool module 308. Further, these two reaction units may be located on opposite sides of flexible rail 312.

Reaction unit 328 may be capable of stabilizing multi-axis carriage 306 during movement of multi-axis carriage 306 along flexible rail 312. Further, reaction unit 328 also may be capable of stabilizing multi-axis carriage 306 during operation of tool 326. In these examples, pressure unit 330 may provide a capability of providing force 336 that is normal to surface 310 as illustrated by arrow 338.

Reaction unit 328 may contact surface 310 continuously or only during certain operations. Reaction unit 328 may generate reactive force 344 in the direction of arrow 339 to counter force 336. Reaction unit 328 may include feet 340 and/or rollers 342. Reaction unit 328 may provide reactive force 344, which may be applied to surface 310. Reactive force 344 may be applied during movement of multi-axis carriage 306 along flexible rail 312 to stabilize multi-axis carriage 306.

Additionally, reaction unit 328 may provide reactive force 344 to counter or provide stability to multi-axis carriage 306 during drilling operations and/or in response to force 336 being generated by pressure unit 330. Pressure unit 330 may include foot 346 and/or rollers 348. Foot 346 may generate force 336. Rollers 348 may allow for further stabilization of multi-axis carriage 306 during movement as well as provide additional contributions to force 336.

In this example, pressure unit 330 may generate force 336 prior to tool 326 performing drilling operations on work piece 302. In these examples, tool 326 may take various forms. For example, without limitation, tool 336 may be drill 350, fastener unit 352, sealing unit 354, and/or some other suitable device. Drill 350 may be used to drill holes 356 into work piece 302. Fastener unit 352 may be used to apply fasteners 358 to work piece 302. Sealing unit 354 applies sealant 359 to drill holes 356.

Further, pressure unit 330 along with tool 326 may be moveable about A-axis 360. This A-axis may be parallel to X-axis 362 along which multi-axis carriage 306 moves when moving along flexible rail 312. By allowing pressure unit 330 and/or tool 326 to move about A-axis 360, tool 326 may be maintained in a position that is normal to surface 310 for performing different operations. Further, pressure unit 330 and/or tool 326 may be locked into place to fix these components with respect to A-axis 360 during an operation.

With the use of multi-axis carriage 306 and tool module 308, a reconfiguration capability may be provided for flexible rail apparatus 300. This capability may allow for reconfiguration of flexible rail apparatus 300 to perform different types of operations by minimizing the time needed for reconfigurations. In contrast to currently available flexible rail systems, flexible rail apparatus 300 may be reconfigured by changing tool module 308.

Tool module 308 may be removed and/or detached from multi-axis carriage 306. For example, if tool module 308 includes drill 350, after drilling holes in work piece 302, tool module 308 may be removed and another version of tool module 308 may be attached to multi-axis carriage 306 to fasten parts for pieces of work piece 302. Further, with this type of configurability, less expense may be needed for flexible rail apparatus 300 because the motors and components in multi-axis carriage 306 do not have to be replicated for each type of tool.

Further, the capability to rotate tool 326 and pressure unit 330 about A-axis 360 in flexible rail apparatus 300 may control pressure unit 330 in a manner to provide positioning of pressure unit 330 and tool 326 normal to surface 310. The change in A-axis 360 only occurs in these examples during pressure unit 330 clamping or changing to allow for normalization when multi-axis carriage 306 moves to another position.

Further, the different advantageous embodiments provided by reaction unit 328 may allow for easier placement of flexible rail apparatus 300 on work piece 302 because only a single flexible rail 312 may be needed rather than two or more rails. Further, by using a singular flexible rail 312, the cost of flexible rail apparatus 300 also may be reduced.

The illustration of flexible rail apparatus 300 in FIG. 3 is not meant to imply physical or architectural limitations to the manner in which different advantageous embodiments may be implemented. This illustration of flexible rail apparatus 300 in FIG. 3 is provided for purposes of illustrating some features that may be found in different advantageous embodiments.

For example, without limitation, in other advantageous embodiments, flexible rail system 304 may include two or more flexible rails rather than just a single flexible rail 312. In yet other advantageous embodiments, tool module motor 322 may be located within tool module 308 rather than within multi-axis carriage 306.

Further, although tool 326 has been described with respect to drill 350, fastener unit 352, and sealing unit 354, tool 326, may include other types of tools in other advantageous embodiments. For example tool 326 may include one or more other tools in addition to or in place of these. These tools may include, for example, without limitation, a drill, a measurement probe, a rivet hammer, a router, a trimming saw, a grinding wheel, and/or some other suitable tool.

Although the different advantageous embodiments described in this example are with respect to aircraft and aircraft parts, other advantageous embodiments may be applied for use in performing operations on other types of work pieces. For example, work piece 302 may be, for example, without limitation, a spacecraft a submarine, a ship, a tank, a power plant structure, a building, bus, train, or some other suitable object.

Figure 4:
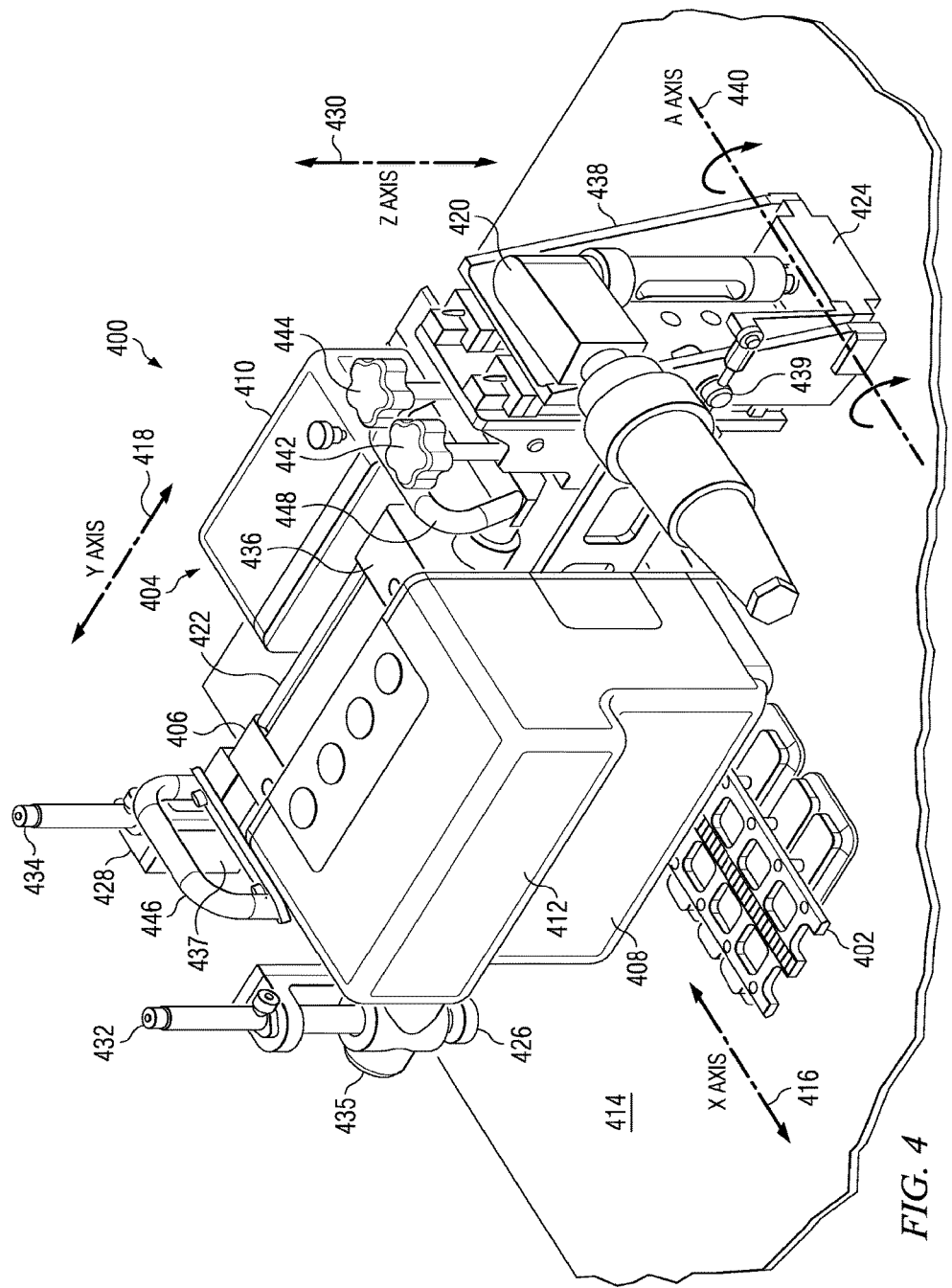
FIG. 4 is a diagram of a perspective view of a flexible rail apparatus in accordance with an advantageous embodiment.

With reference now to FIG. 4, a diagram of a perspective view of a flexible rail apparatus may be depicted in accordance with an advantageous embodiment. In this illustrative example, flexible rail apparatus 400 includes flexible vacuum rail 402, multi-axis carriage 404, and tool module 406. Multi-axis carriage 404 may include rail motor 408, tool module motor 410, and controller 412. Tool module 406 may be removably coupled to multi-axis carriage 404.

In these illustrative examples, flexible vacuum rail 402 may be removably attached using vacuum forces attached to surface 414.

Multi-axis carriage 404 may move along X-axis 416, while moving along flexible vacuum rail 402. Additionally, multi-axis carriage 404 may move tool module 406 along Y-axis 418 using tool module motor 410. Through this movement, drill 420 may be moveable about X-axis 416 and/or Y-axis 418.

Tool module 406 also may include pressure foot 424, reaction foot 426, and reaction foot 428. Pressure foot 424 is an example of an implementation of pressure unit 330 in FIG. 3. Reaction foot 426 and reaction foot 428 are examples of an implementation of reaction unit 328 in FIG. 3. Reaction foot 426 and reaction foot 428 may move along Z-axis 430 to engage surface 414 after multi-carriage 404 moves to a location on surface 414.

Surface 414 may have z-axis 430 that changes as movements are made in the direction of x-axis 416 and/or y-axis 418. Flexible vacuum rail 402 may accommodate and/or accept curvature along a plane defined by y-axis 418 and z-axis 430. The rotation of pressure foot 424 and/or drill 420 around A-axis 440 may accommodate changes in a plane defined by x-axis 416 and z-axis 430. In this manner, z-axis 430 remains normal to surface 414.

After reaction foot 426 and reaction foot 428 engage surface 414, pressure foot 424 also may move along Z-axis 430 to engage surface 414. Pressure foot 424 may engage surface 414 to provide a preload force on surface 414 prior to a drilling operation to be performed by drill 420. In these examples, pressure foot 424 may merely apply pressure downward onto surface 414. In some advantageous embodiments, pressure foot 424 also may engage surface 414 using a vacuum.

The force applied by pressure foot 424 may be greater than the force applied by drill 420 as a drilling operation occurs. Reaction foot 426 and/or reaction foot 428 may counteract the force generated by pressure foot 424 to stabilize multi-access carriage 404. The counter balance may be to react against any moments about rail 402. In this depicted example, reaction foot 426 and/or reaction foot 428 may be moved along Z-axis 430 using biasing mechanism 432 and biasing mechanism 434.

After reaction foot 426 and reaction foot 428 are in place, locking mechanisms 435 and 437 may be used to lock reaction foot 426 and/or reaction foot 428 in place. These locking mechanisms may be used after biasing mechanisms 432 and 434 move reaction foot 426 and/or reaction foot 428 to surface 414. Pressure foot 424 may be moved along the Z-axis 430 by biasing mechanism 436.

Biasing mechanisms 432, 434, and 436 may be any kind of actuator. In this illustrative example, a pneumatic cylinder may be used in biasing mechanism 434. Other examples of biasing mechanisms include, for example, without limitation, a pneumatic clamp, a quick acting nut, a cam lock, an electrical solenoid type brake, a spring, and/or some other suitable device.

Further, in these advantageous embodiments, pressure foot 424 and/or drill 420 may be moved along A-axis 440. More specifically, drill 420 may be mounted on pressure foot 424, which may be rotatable around A-axis 440. Drill 420 may be removably attached to pressure foot 424 in housing 438. Pressure foot 424 also may be rotatable around Z-axis 430 in these examples. In the depicted example, A-axis 440 may be substantially parallel to X-axis 416.

The rotation of pressure foot 424 and/or drill 420 around A-axis 440 may be performed using biasing mechanism 436 to maintain these components substantially normal to surface 414. After pressure foot 424 and/or drill 420 have been positioned with respect to A-axis 440, these components may be locked using locking mechanism 439. In this manner, holes drilled into surface 414 may be substantially normal to surface 414 rather than at an angle less than normal. Rotation of drill 420 and/or pressure foot 424 in housing 438 around A-axis 440 may be performed to compensate for local contours in surface 414.

Biasing mechanism 436 also may be locked with pressure foot 424 in place to prevent movement about A-axis 440. Through locking mechanism 439, stability of pressure foot 424 may be maintained during drilling operations using drill 420.

Fastener 442 and/or fastener 444 may be used to couple tool module 406 to multi-axis carriage 404. Additionally, handle 446 and handle 448 may be attached to frame 422 of tool module 406. Handle 446 and/or handle 448 may provide an operator the capability to more easily remove and/or place tool module 406 onto multi-axis carriage 404.

In these examples, fasteners 442 and 444 may be, for example, without limitation, bolts, screws, cam lock, and/or some other suitable fastening mechanisms. These fasteners may be manipulated to engage and disengage tool module 406 from multi-axis carriage 404. In this manner, the different advantageous embodiments may provide a capability to change the configuration of flexible rail apparatus 400 with reduced effort as compared to changing the entire apparatus.

Further, increased flexibility may be provided through the use of housing 438, which may be configured to removably accept a tool, such as, for example, without limitation, drill 420. In this manner, different tool configurations may be generated for flexible rail apparatus 400 through removability of tool module 406 and/or drill 420.

Figure 5:
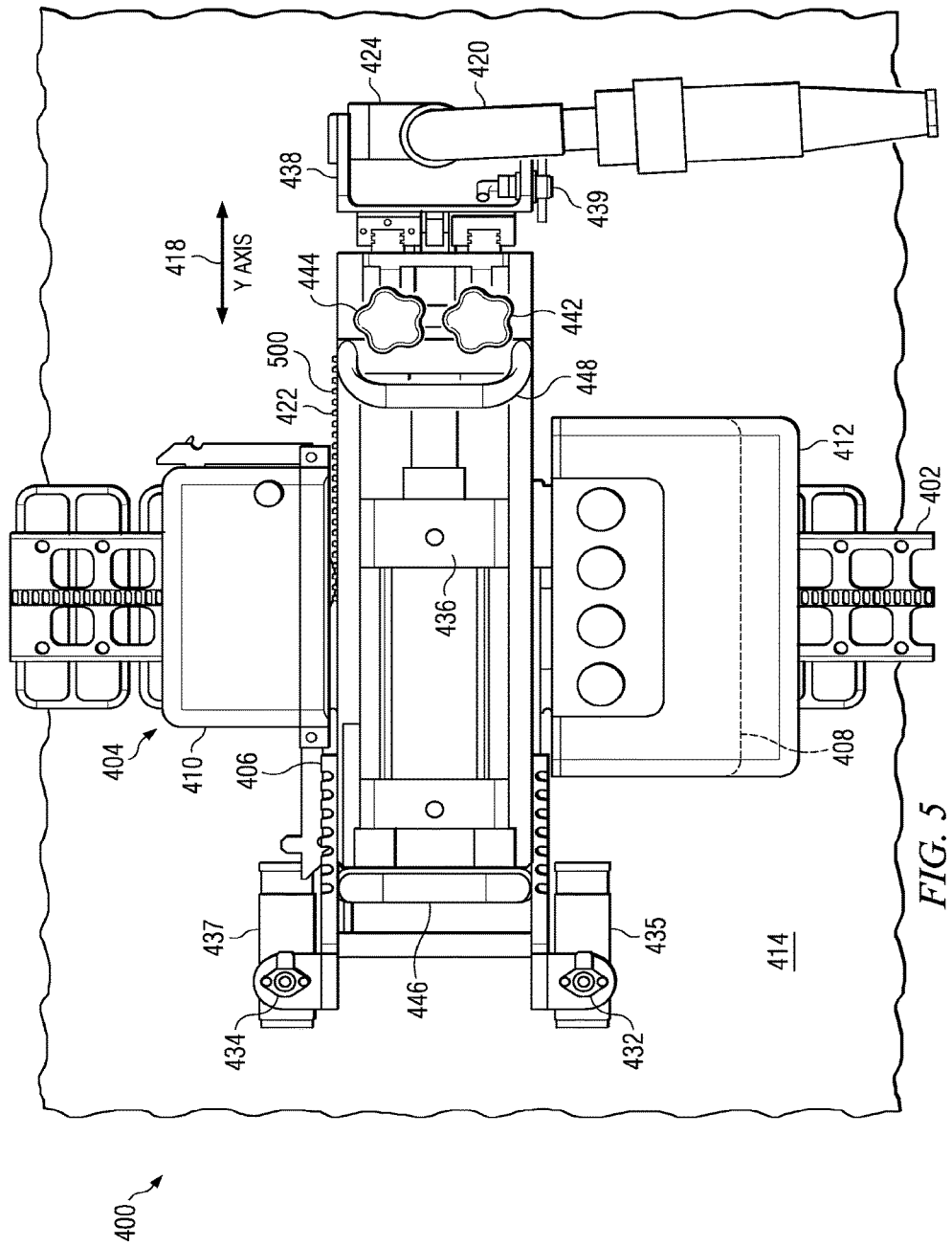
FIG. 5 is a diagram of a top view of a flexible rail apparatus in accordance with an advantageous embodiment.

With reference now to FIG. 5, a diagram of a top view of a flexible rail apparatus is depicted in accordance with an advantageous embodiment. As can be seen in this illustrative example, tool module motor 410 in multi-axis carriage 404 may move motorized rail 500. Movement of motorized rail 500 may cause movement of tool module 406 along Y-axis 418. Although motorized rail 500 is illustrated, other types of devices may be used to move tool module 406 along Y-axis 418. For example, without limitation, a bell screw, a racking pinion mechanism, a belt driven mechanism, a linear actuator, and/or some other suitable device may be used.

Figure 6:
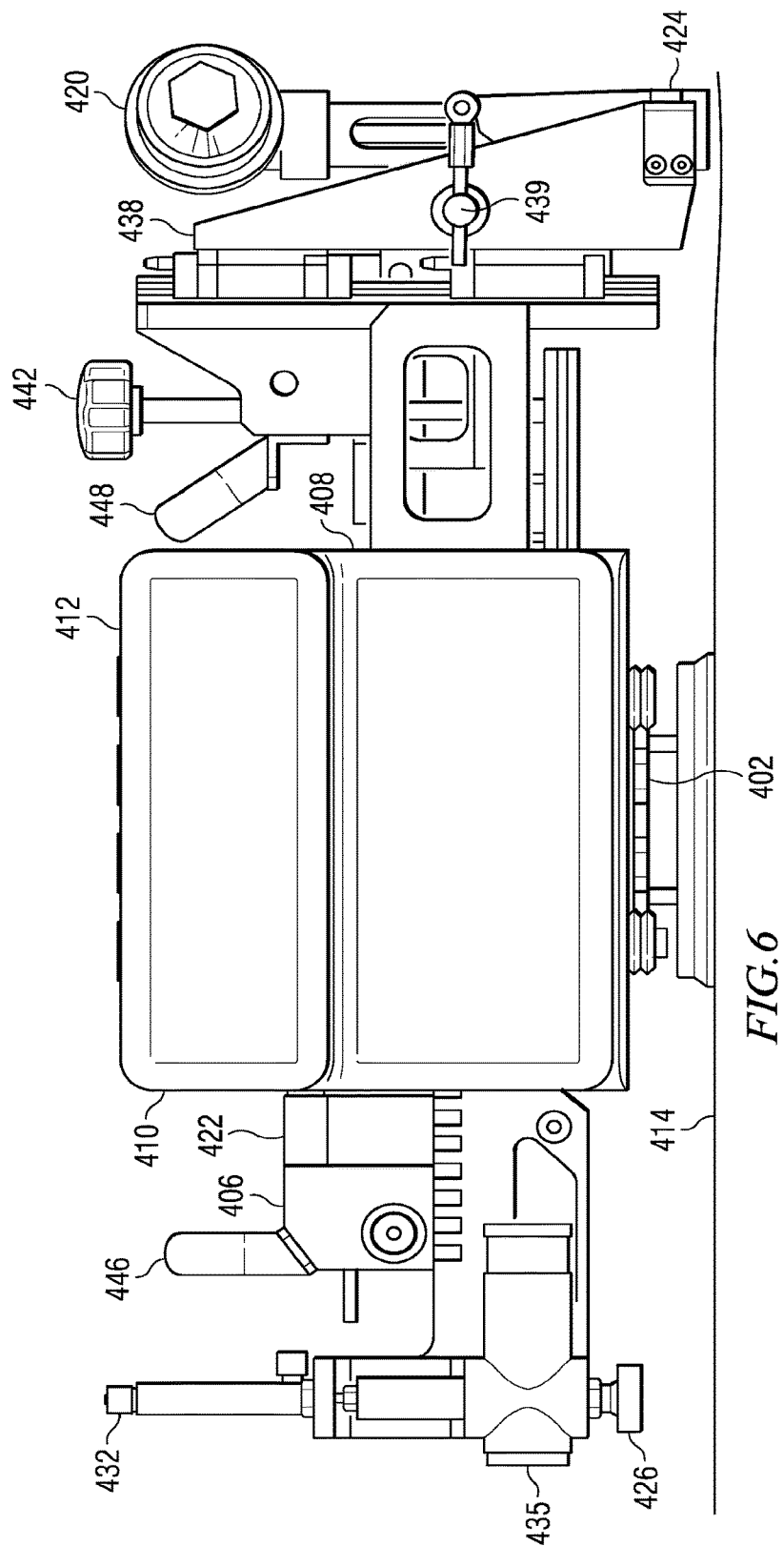
FIG. 6 is a diagram of a front view of a flexible rail apparatus in accordance with an advantageous embodiment.
Figure 7:
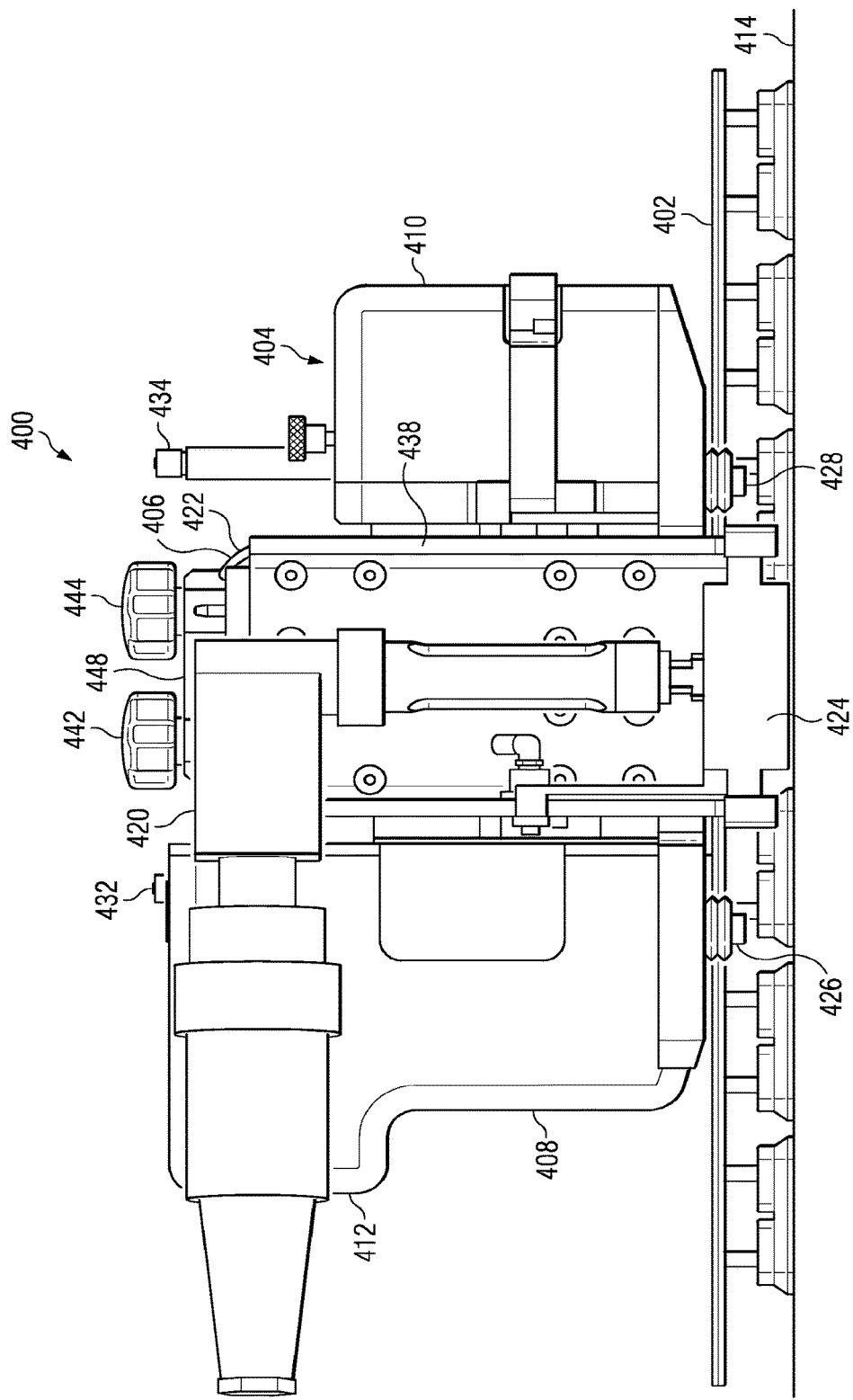
FIG. 7 is a diagram of a side view of a flexible rail apparatus in accordance with an advantageous embodiment.

With reference now to FIG. 6, a diagram of a front view of a flexible rail apparatus is depicted in accordance with an advantageous embodiment. Next, FIG. 7 is a diagram of a side view of a flexible rail apparatus in accordance with an advantageous embodiment.

Figure 8:
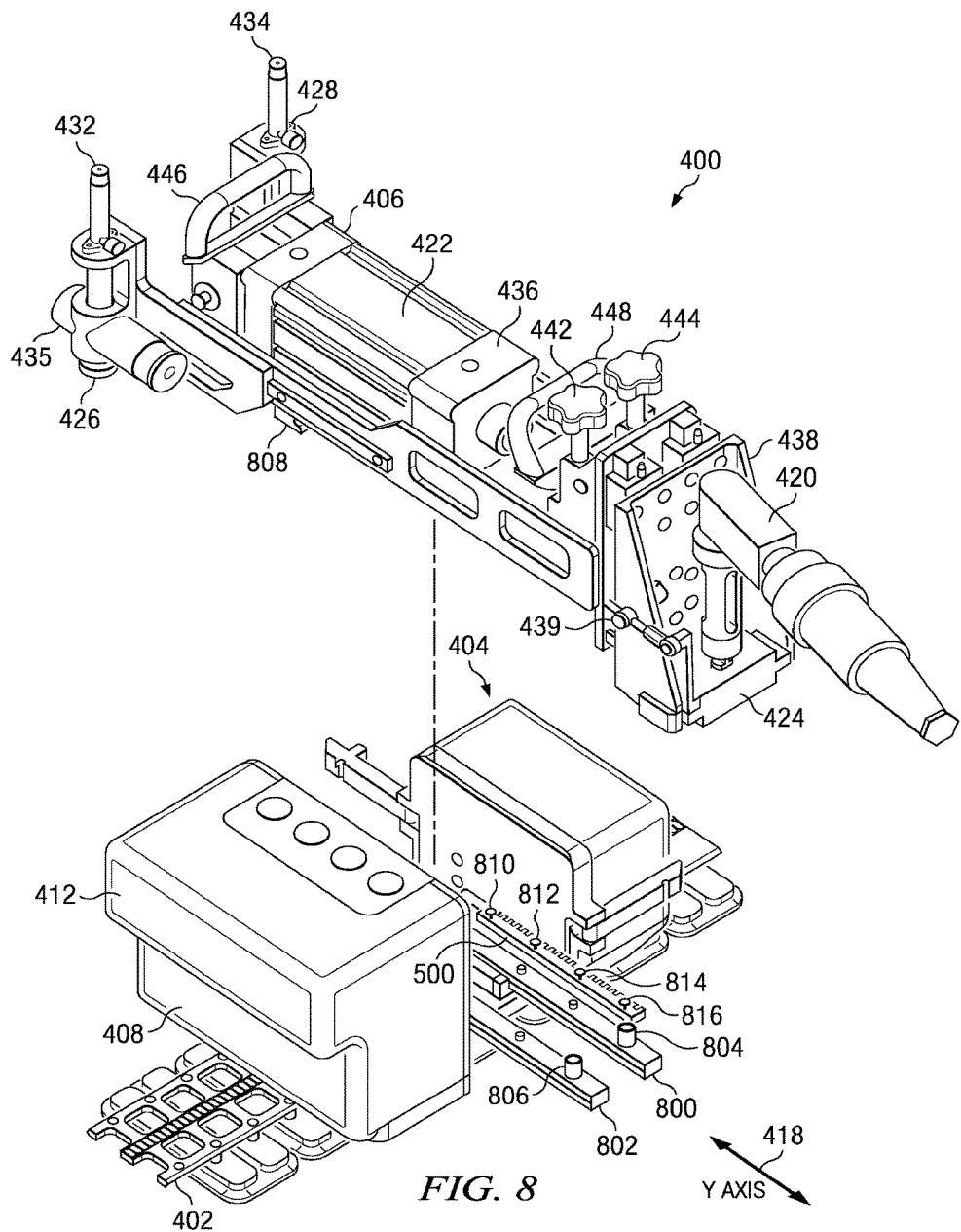
FIG. 8 is a diagram of a perspective view of a flexible apparatus in which the tool module is disengaged from the multi-axis carriage.

Next, FIG. 8 is a diagram of a perspective view of a flexible apparatus in which tool module 406 may be disengaged from multi-axis carriage 404 in accordance with an advantageous embodiment. In this particular example, rail 800 and rail 802 also may be seen. Frame 422 may engage rail 800 and/or rail 802. These rails may provide for movement along Y-axis 418. In this example, attachment point 804 and attachment point 806 may be located on rail 800 and rail 802. Attachment point 804 and attachment point 806 may provide points of attachment and/or engagement for fastener 442 and fastener 444.

Further, frame 422 also may include end hook 808 which may attach to rail 802 to aid in securing frame 422 to rail 802. Another end hook (not shown) may be used to aid in securing frame 422 to rail 800. Also in this view, motorized rail 500 may include engagement points 810, 812, 814, and 816, which may engage frame 422 to allow motorized rail 500 to move frame 422 on rails 800 and 802 along Y-axis 418.

Figure 9:
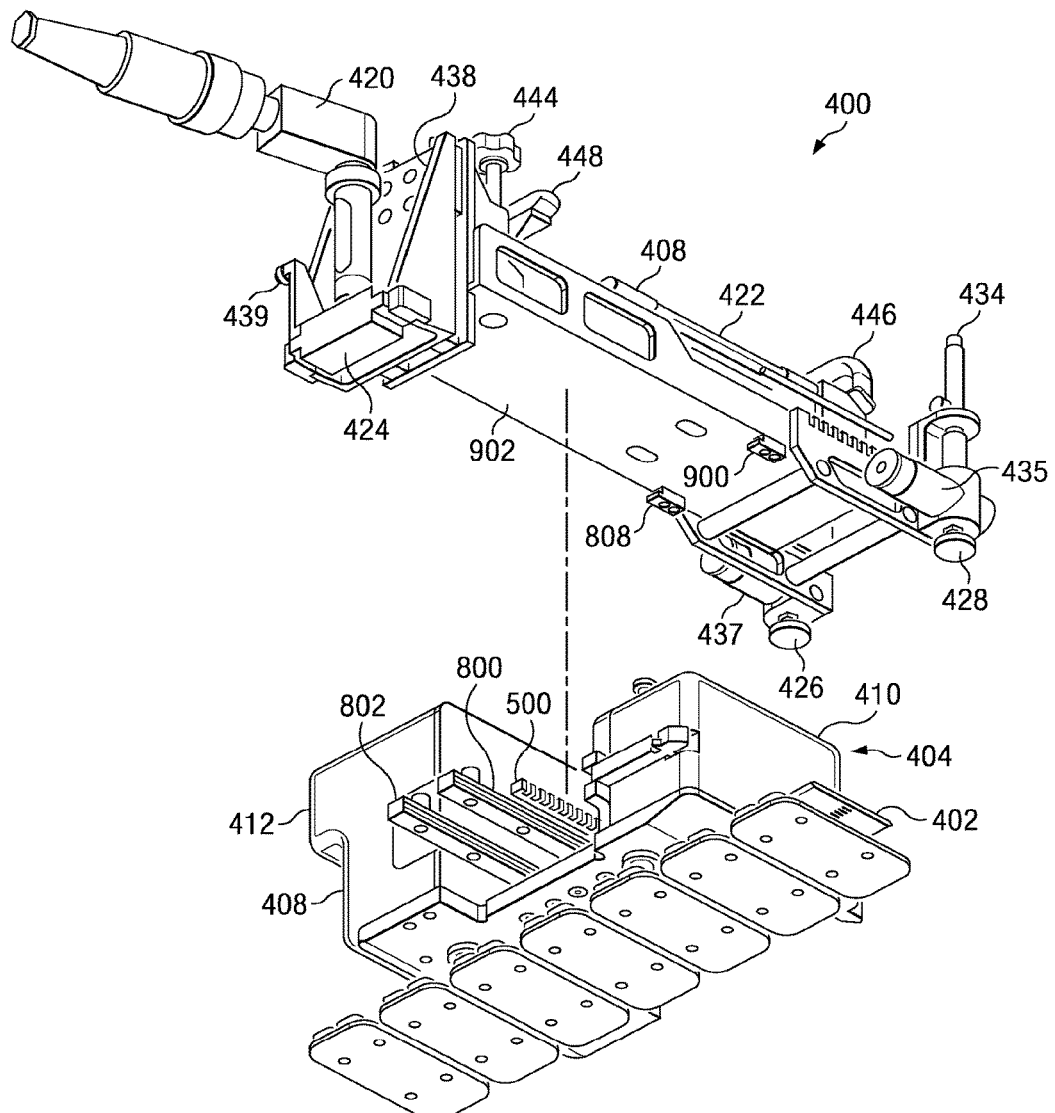
FIG. 9 is a diagram of another perspective view of a tool module detached from a multi-axis carriage in accordance with an advantageous embodiment.

With reference now to FIG. 9, a diagram of another perspective view of a tool module detached from a multi-axis carriage is depicted in accordance with an advantageous embodiment. In this example end hook 808 and end hook 900 may be seen on bottom 902 of frame 422. End hook 808 and end hook 900 may engage rail 800 and rail 802 to aid in coupling frame 422 to multi-axis carriage 404.

Flexible rail apparatus 400 illustrated in FIGS. 4-9 has been provided for illustrating one manner in which a flexible rail apparatus may be implemented. This illustration is not meant to imply physical and/or architectural limitations to a manner in which other advantageous embodiments may be implemented.

For example, in other advantageous embodiments only one reaction foot may be employed rather than both reaction foot 426 and reaction foot 428. In other embodiments, motorized rail 500 may be attached to frame 422 rather than multi-axis carriage 404.

Figure 10:
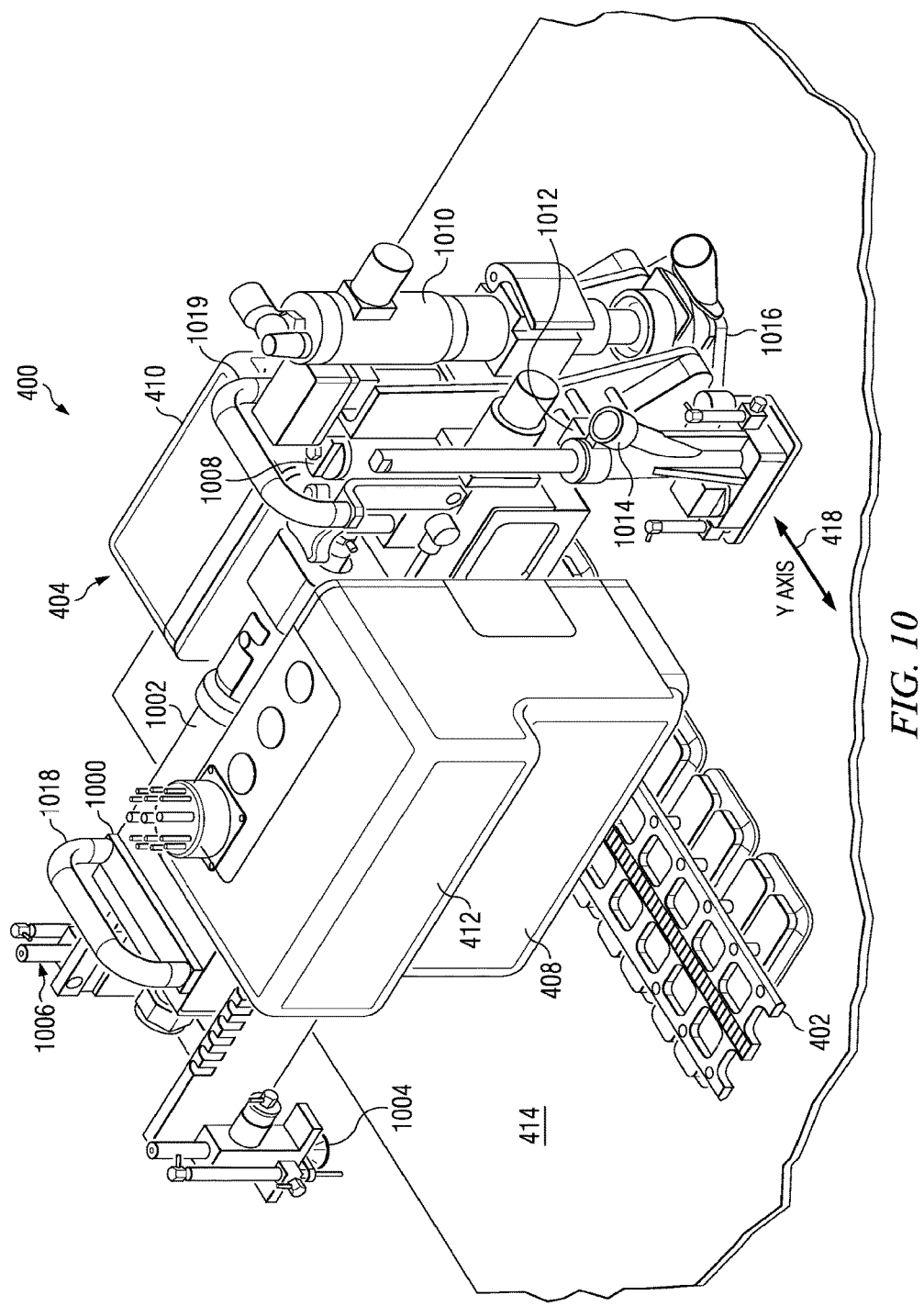
FIG. 10 is a diagram of a flexible rail apparatus in accordance with an advantageous embodiment.

With reference now to FIG. 10, a diagram of a flexible rail apparatus is depicted in accordance with an advantageous embodiment. In this example, flexible rail apparatus 400 has been reconfigured to include tool module 1000 in place of tool module 406 in FIG. 4.

In this example, tool module 1000 may include frame 1002. Reaction foot 1004 and reaction foot 1006 are examples of an implementation of reaction unit 328 in FIG. 3 and may be attached to frame 1002. In this example, housing 1008 may include multiple tools. As illustrated, housing 1008 may include drill 1010, seal applicator module 1012, and bolt insertion module 1014.

Housing 1008 also may include pressure foot 1016, which may be used with drill 1010 to perform drilling operations. Pressure foot 1016 is an example of an implementation of pressure unit 330 in FIG. 3.

Handle 1018 and handle 1019 may be attached to frame 1002 of tool module 1000. Handle 1018 and handle 1019 may provide grips for an operator to use in attaching and/or detaching tool module 1000 from multi-axis carriage 404. In this illustrative example, drill 1010, seal applicator module 1012, and bolt exertion module 1014 may all rotate around A-axis 1020.

Figure 11:
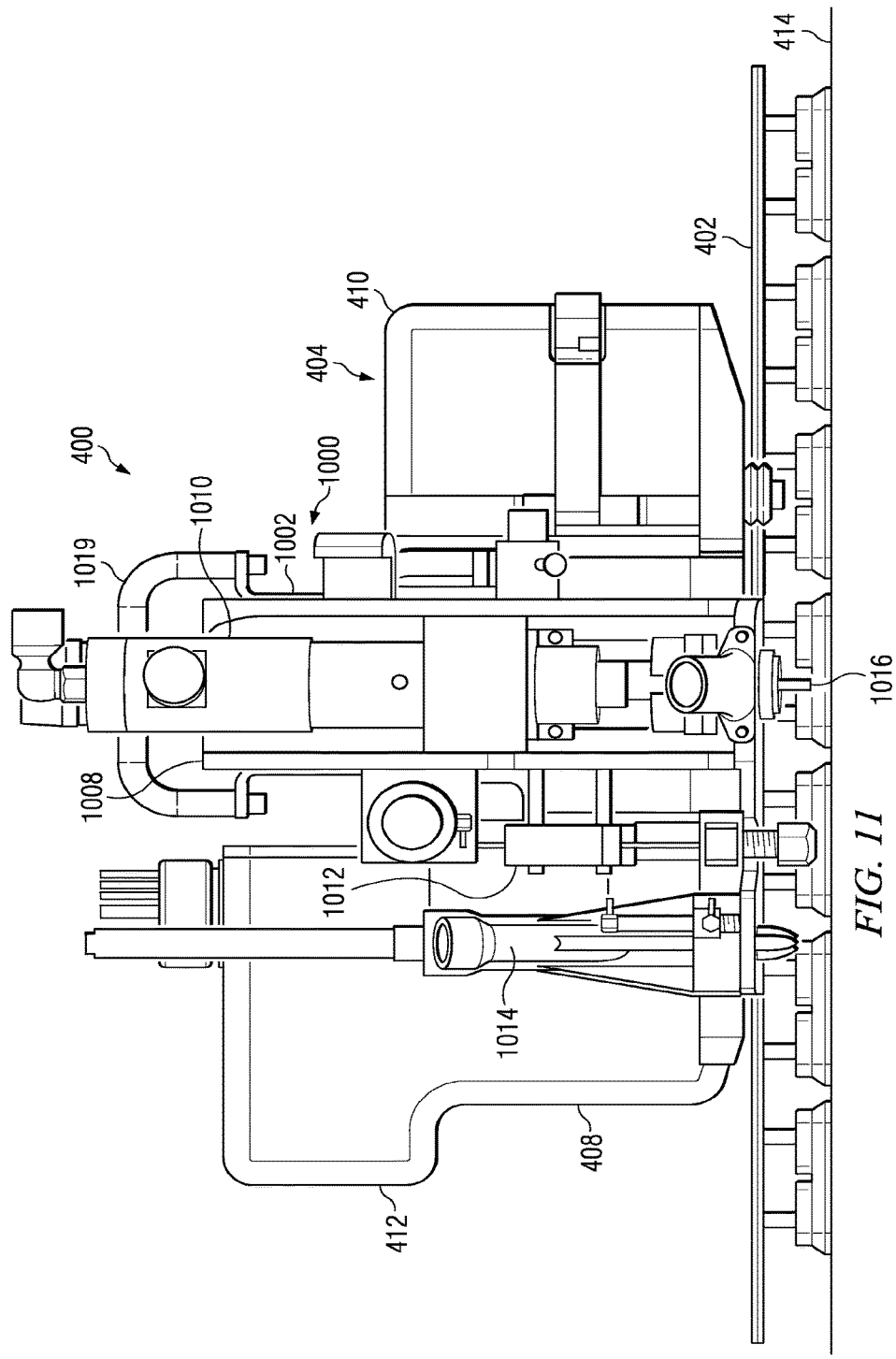
FIG. 11 is a side view of a flexible rail apparatus with multiple tools in accordance with an advantageous embodiment.

With reference next to FIG. 11, a side view of a flexible rail apparatus with multiple tools is depicted in accordance with an advantageous embodiment. In this example, another view of flexible rail apparatus 400 is depicted with tool module 1000.

Figure 12:
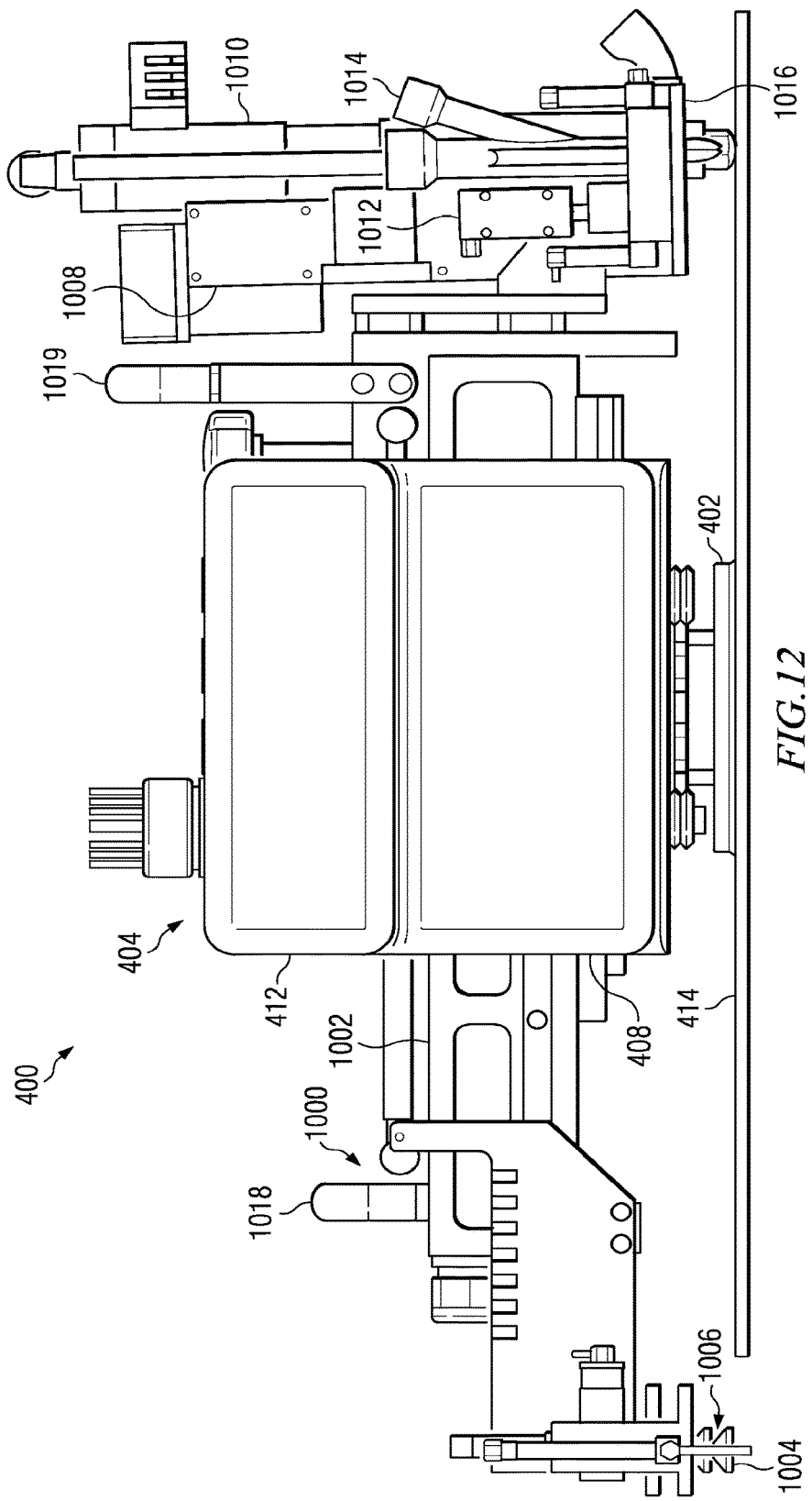
FIG. 12 is a diagram of a front view of a flexible rail apparatus in accordance with an advantageous embodiment.

With reference now to FIG. 12, a diagram of a front view of a flexible rail apparatus is depicted in accordance with an advantageous embodiment. In this example, a front view of multi-axis carriage 404 with tool module 1000 is shown.

Figure 13:
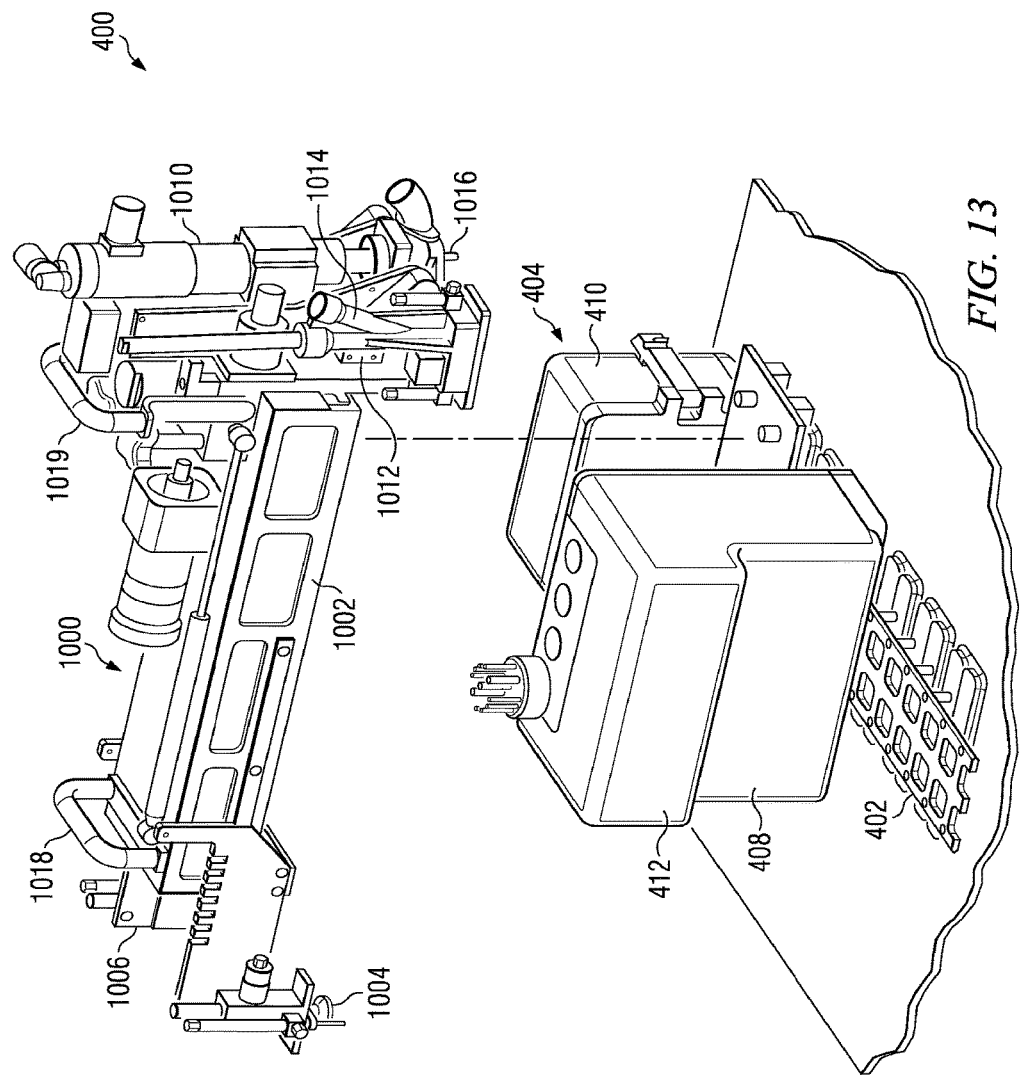
FIG. 13 is a diagram of a perspective view with a tool module separated from a multi-axis carriage in accordance with an advantageous embodiment.

With reference next to FIG. 13, a diagram of a perspective view with a tool module separated from a multi-axis carriage is depicted in accordance with an advantageous embodiment. In this example, tool module 1000 may be uncoupled from multi-axis carriage 404.

Thus, different tool modules may be placed and/or coupled with multi-axis carriage 404 to reconfigure flexible rail apparatus 400. These reconfigurations may be more quickly performed as compared to currently available flexible rail systems. This modularity may allow for quick replacement of tools. Further, the different tools illustrated in these examples also may be removable from their housings.

Figure 14:
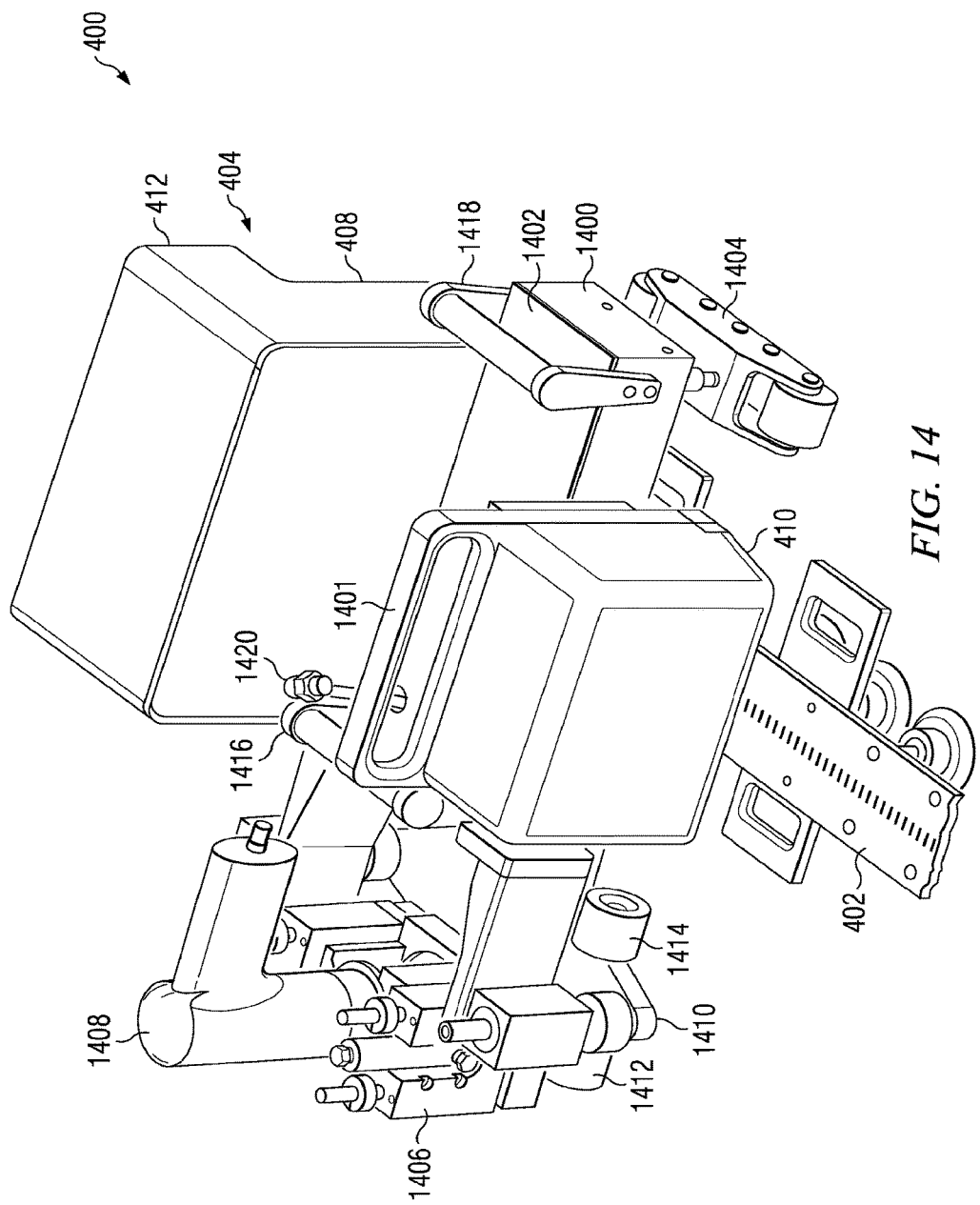
FIG. 14 is a diagram illustrating another configuration of a flexible rail apparatus in accordance with an advantageous embodiment.

With reference now to FIG. 14, a diagram illustrating another configuration of a flexible rail apparatus is depicted in accordance with an advantageous embodiment. In this additional illustrative example, flexible rail apparatus 400 may have tool module 1400 coupled to multi-axis carriage 404. In this illustrative example, handle 1401 may be attached to multi-axis carriage 404 to provide for easier handling by an operator.

Tool module 1400 may include frame 1402. Housing 1406 may be attached to frame 1402 and may hold rivet gun 1408. Rivet gun 1408 also may be removable from housing 1406 in these examples. Reaction rollers 1404 may be attached to frame 1402. In this embodiment, rollers may be used in place of reaction feet. Reaction rollers 1404 may be another example of an implementation of reaction unit 328 in FIG. 3.

As illustrated in this example, pressure foot car 1410 may be attached to housing 1406 along with rollers 1412 and 1414. The use of these rollers with pressure foot car 1410 and reaction rollers 1404 may provide for additional stability of multi-axis carriage 404 when moving along flexible rail 402.

Handle 1416 and handle 1418 may be attached to frame 1302. Handle 1416 and handle 1418 may be used to remove tool module 1400 from multi-axis carriage 404. In this example, fastener 1420 may be used to engage and/or attach tool module 1400 to multi-axis carriage 404.

Figure 15:
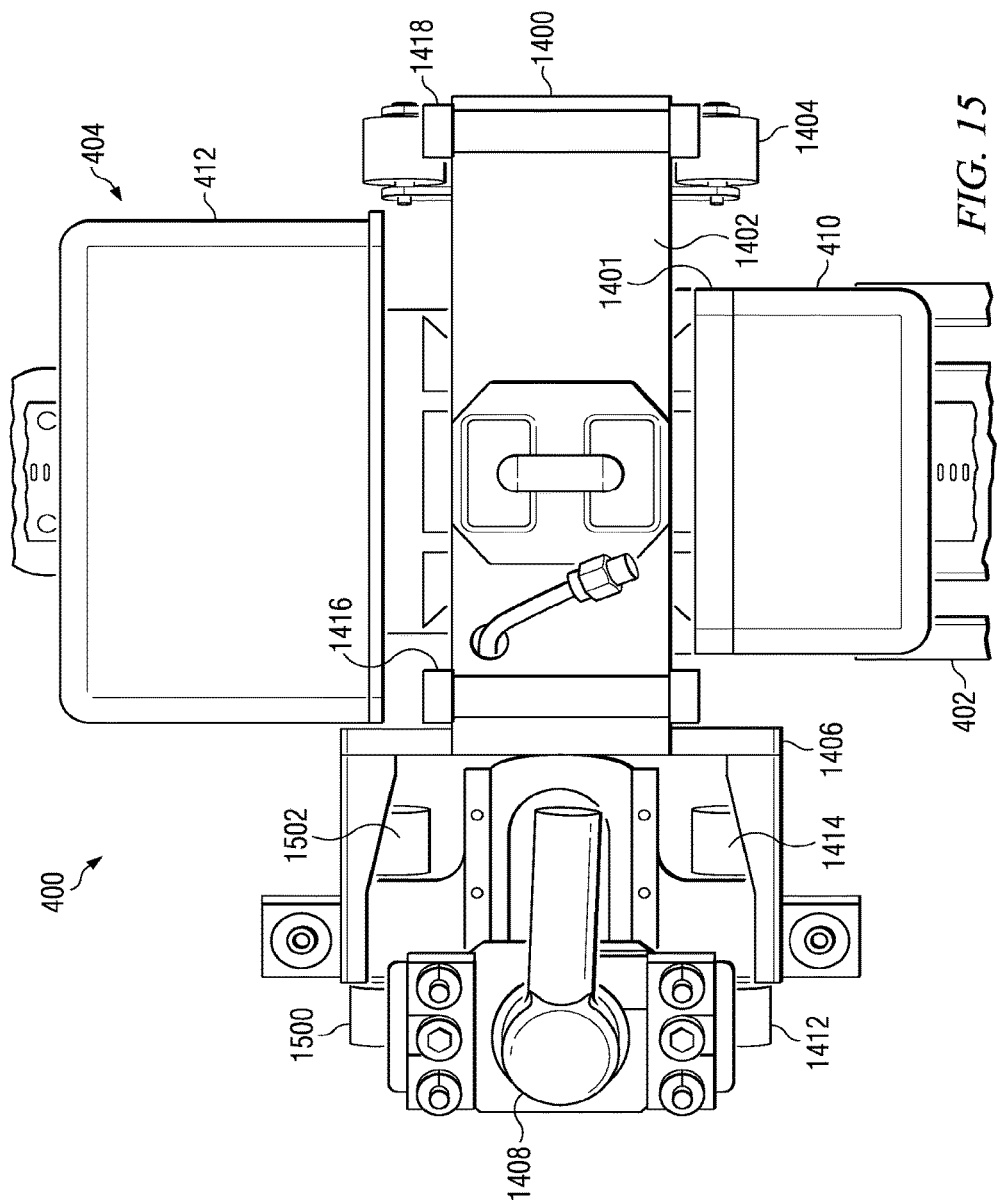
FIG. 15 is a diagram of a top view of a flexible rail apparatus in accordance with an advantageous embodiment.

With reference now to FIG. 15, a diagram of a top view of a flexible rail apparatus is depicted in accordance with an advantageous embodiment. In this view, rollers 1500 and 1502 also may be seen attached to housing 1406.

Figure 16:
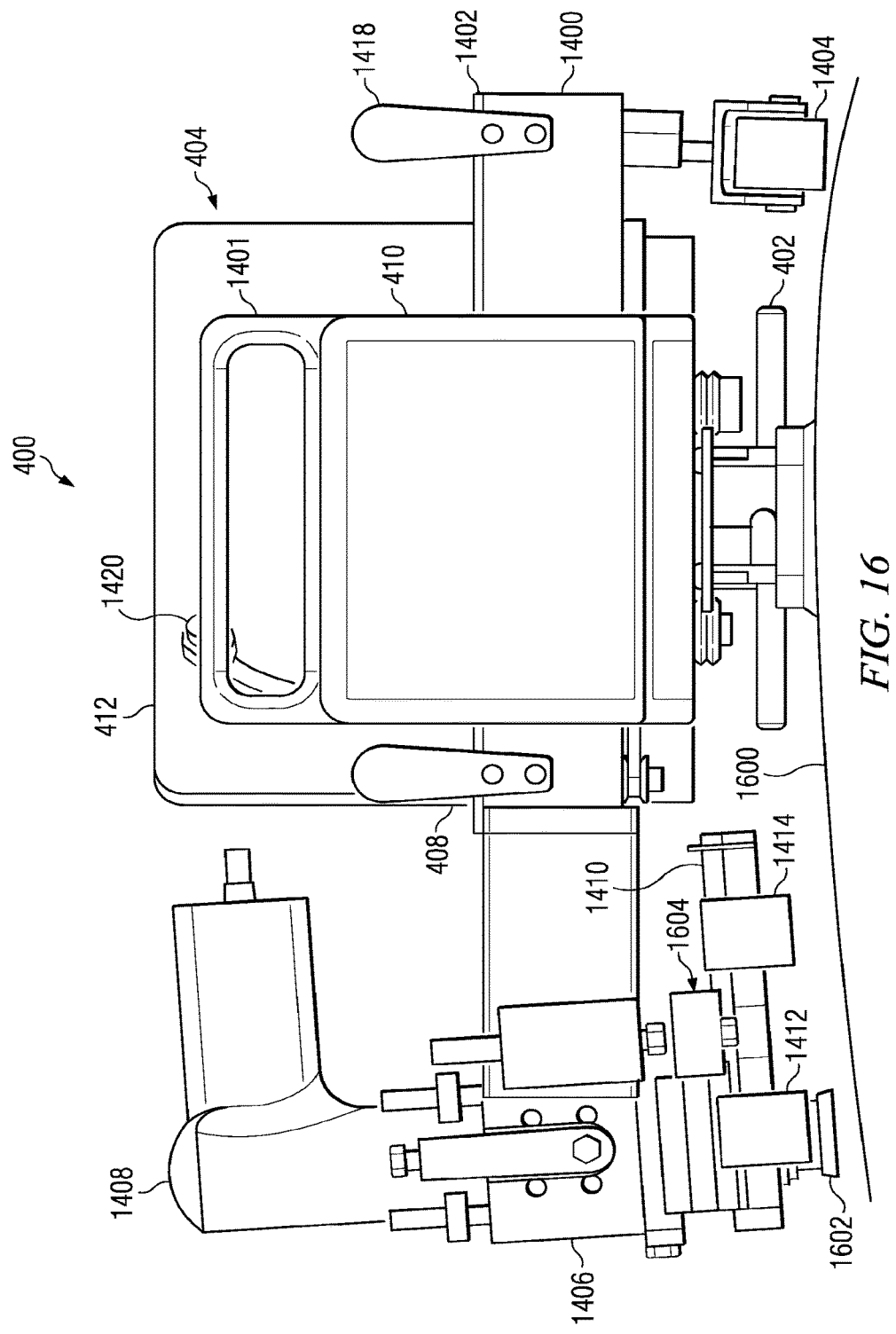
FIG. 16 is a diagram illustrating a flexible rail apparatus on a curved surface in accordance with an advantageous embodiment.

With reference now to FIG. 16, a diagram illustrating a flexible rail apparatus on a curved surface is depicted in accordance with an advantageous embodiment. In this example, flexible rail apparatus 400 may be placed on curved surface 1600. Further, in this view, pressure foot 1602 may be seen attached to pressure foot car 1410. Pressure foot car 1410 and reaction rollers 1404 may be angled to more closely match contours in curved surface 1600. The axis angularity of pressure foot car 1410 may be maintained using elastomeric cushion 1604 in these examples.

The illustration of the different configurations for flexible rail apparatus 400 in FIGS. 4-16 are not meant to imply physical or architectural limitations to the manner in which a flexible rail apparatus 400 may be constructed and/or implemented in providing different features of the advantageous embodiments. For example, although the different advantageous embodiments illustrate the tools on tool module 406 being to the right side of multi-axis carriage 404, in other advantageous embodiments, one or more tools may be located on the left side. In yet other advantageous embodiments, a tool may be located on both sides of multi-axis carriage 404. Further, in other advantageous embodiments, a reaction unit containing components such as, for example, reaction feet, may be unnecessary.

Figure 17:
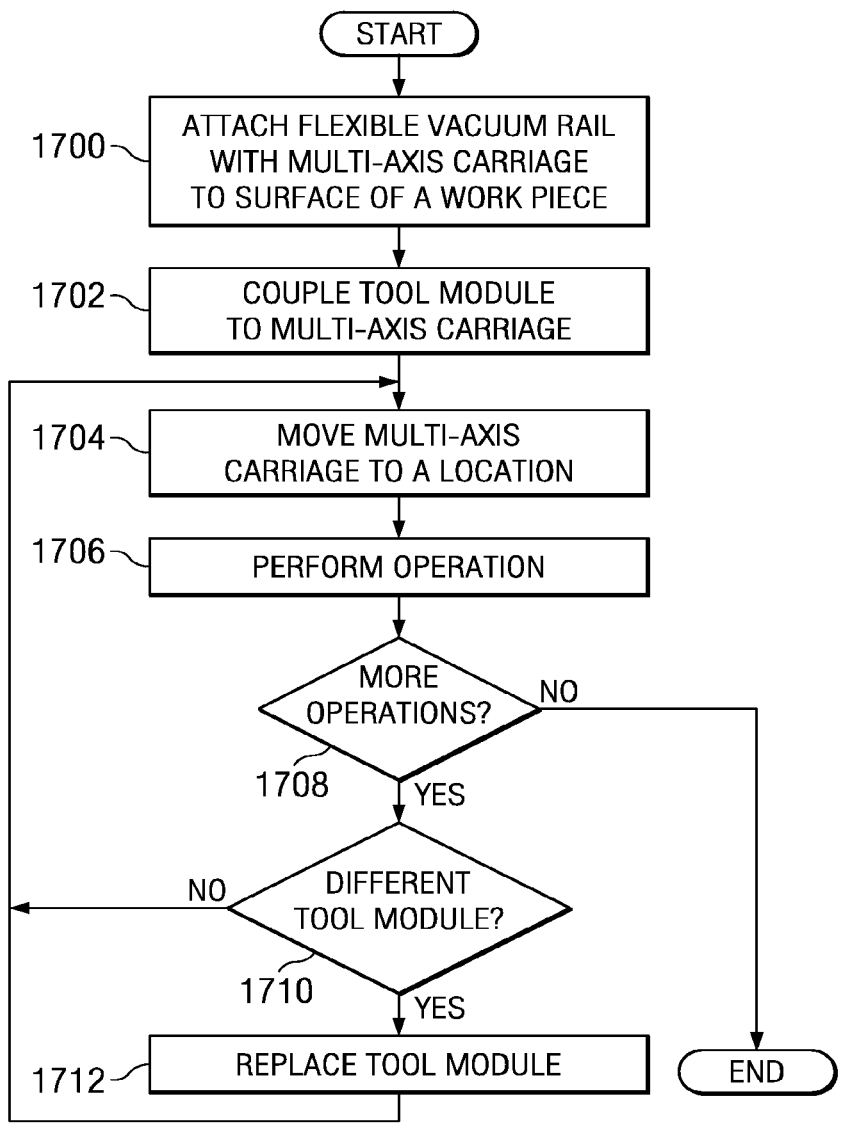
FIG. 17 is a flowchart of a process for performing an operation on a work piece in accordance with an advantageous embodiment.

With reference now to FIG. 17, a flowchart of a process for performing an operation on a work piece is depicted in accordance with an advantageous embodiment. The process illustrated in FIG. 17 may be implemented using a flexible rail apparatus such as, for example, without limitation, flexible rail apparatus 300 in FIG. 3.

The process may begin by attaching flexible vacuum rail 402 in FIG. 4, with multi-axis carriage 404 coupled to flexible vacuum rail 402, to surface 310 of work piece 302 in FIG. 3 (operation 1700). The process may also begin by attaching the flexible vacuum rail to the surface of the work piece, and subsequently attaching the multi-axis carriage to the flexible vacuum rail. The process then may couple tool module 406 to multi-axis carriage 404 (operation 1702). The process may then move multi-axis carriage 404 to a location (operation 1704).

An operation may be performed at the location (operation 1706). This operation may be, for example, without limitation, a drilling operation, a sealing operation, a fastening operation, a measuring operation, and/or some other suitable operation. A determination may be then made as to whether additional operations are to be performed (operation 1708).

If additional operations are to be performed, a determination may be made as to whether a different tool module may be needed (operation 1710). If a different tool module is needed, the process may replace the current tool module with another tool module (operation 1712) with the process then returning to operation 1704. If a different tool module is not needed, the process may then proceeds directly to operation 1704 as described above. With reference again to operation 1708, if more operations are not needed, the process then terminates.

The illustration of the operations in FIG. 17 is not meant to limit the manner in which operations may be performed on a work piece. Other operations may be performed in addition to or in place of the operations illustrated. Also, operations illustrated in the process in FIG. 17 may be performed in different orders depending on the particular implementation. In some advantageous embodiments, operation 1702 may be performed prior to operation 1700. As another non-limiting example, multi-axis carriage 404 may be attached to flexible vacuum rail 402 after flexible vacuum rail 402 has been attached to the work surface.

Figure 18:
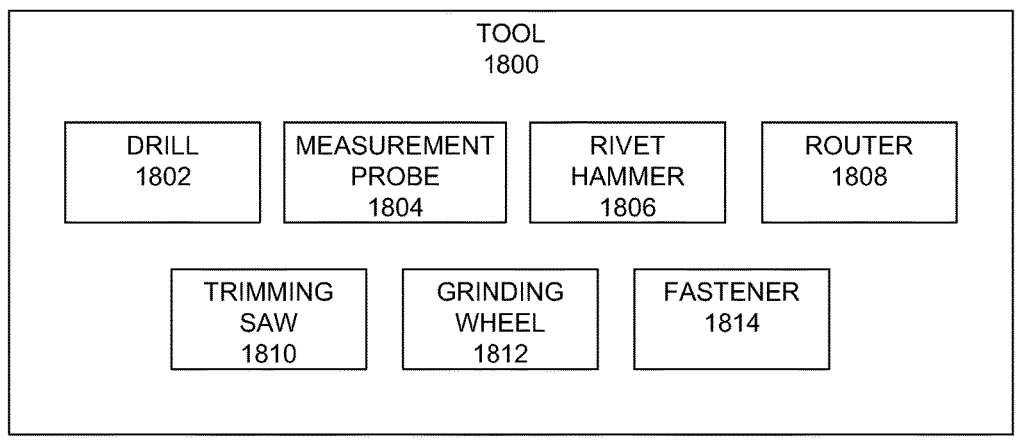
FIG. 18 is a block diagram of a tool in accordance with an illustrative embodiment.

FIG. 18 is a block diagram of a tool in accordance with an illustrative embodiment. As described above with respect to FIG. 3, tool 1800 may be a suitable tool, such as tool 326 of FIG. 3. For example, tool 1800 may be drill 1802, measurement probe 1804, rivet hammer 1806, router 1808, trimming saw 1810, grinding wheel 1812, and/or fastener 1814.

Figure 19:
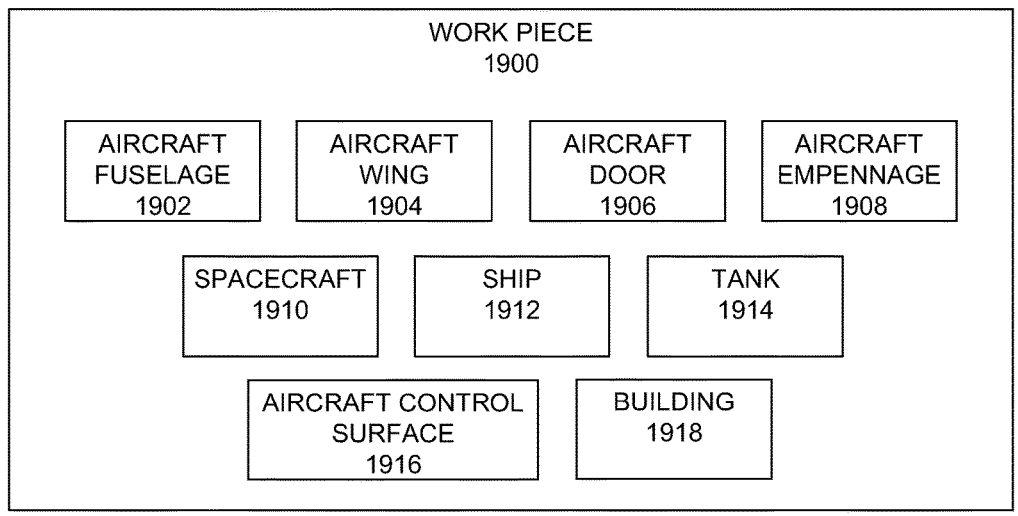
FIG. 19 is a block diagram of a work piece in accordance with an illustrative embodiment.

FIG. 19 is a block diagram of a work piece in accordance with an illustrative embodiment. As described above with respect to FIG. 3, work piece 1900 may be of different types, such as work piece 302 of FIG. 3. For example, work piece 1900 may be aircraft fuselage 1902, aircraft wing 1904, aircraft door 1906, aircraft empennage 1908, spacecraft 1910, ship 1912, tank 1914, aircraft control surface 1916, or building 1918.

Thus, the different advantageous embodiments provide a method and apparatus for performing operations on a work piece. In the different advantageous embodiments, a flexible rail system may be attached to a work surface. A multi-axis carriage may be coupled to a flexible rail system in which the multi-axis carriage may be capable of moving along the flexible rail system and may be capable of moving a tool in axes relative to the work surface. Further, a tool module capable of being removably coupled to the multi-axis carriage may be employed in which the tool has a frame and the tool may be mounted to the frame.

In the different advantageous embodiments, a single flexible rail may be used. A reaction unit may be used to stabilize the multi-axis carriage during the operation of the tool and possibly during the operation of movement of the multi-axis carriage.

The use of the phrase "at least one of" when used with a list of items means that different combinations of one or more of the items may be used. This list may mean that more than one of each type of item in the list may be needed. For example, "at least one of item A, item B, and item C" may include, for example, without limitation, item A or item A and item B. This example also may include item A, item B, and item C. Also, this example may include two of item A, one of item B, and three of item C. Of course any suitable combination of items and number of items may be employed depending on the particular implementation.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for performing at least a first operation and a second operation on a workpiece, the second operation being different from the first operation, the method comprising:

attaching a flexible vacuum rail to a surface of a work piece, wherein a multi-axis carriage is coupled to the flexible vacuum rail;

coupling a first tool module to the multi-axis carriage, wherein the first tool module comprises a first tool-module frame, a first reaction unit on a first side of the first tool-module frame, a first pressure unit on a second side of the first tool-module frame, opposite the first side, and a first tool, removably connected to the first tool-module frame, wherein the first tool is configured to perform the first operation;

moving the multi-axis carriage along the flexible vacuum rail to a first location on the work piece;

performing the first operation with the first tool at the first location;

removing the first tool module from the multi-axis carriage after performing the first operation;

installing a second tool module to the multi-axis carriage, wherein the second tool module comprises a second tool-module frame, a second reaction unit on a first side of the second tool-module frame, a second pressure unit on a second side of the second tool-module frame, opposite the first side, and a second tool, removably connected to the second tool-module frame, wherein the second tool is configured to perform the second operation; and performing the second operation with the second tool at the first location or at a second location, different from the first location.

2. The method of claim 1, wherein performing the first operation at the first location comprises:

applying a force against the surface with the first pressure unit located on the first side of the first tool-module frame, wherein the first pressure unit is rotatable around an axis parallel to an axis of movement of the multi-axis carriage and wherein force is normal to the surface;

providing a reactive force to the force with the first reaction unit located on the second side of the first tool-module frame; and performing the first operation after the force and the reactive force are applied.

3. The method of claim 2, wherein the first operation is selected from at least one of a drilling operation, a sealing operation, a measuring operation, and a fastening operation.

4. The method of claim 1, wherein removing the first tool module from the multi-axis carriage comprises lifting the first toolmodule using handles attached to the first tool-module frame.

5. A method for performing an operation on an aircraft work piece, the method comprising:

attaching a flexible vacuum rail to a surface of the aircraft work piece, wherein a multi-axis carriage is coupled to the flexible vacuum rail;

coupling a tool module to the multi-axis carriage, wherein the tool module comprises a first tool-module frame, a pressure unit, located on a first side of the first tool-module frame, a reaction unit, located on a second side of the first tool-module frame, and a tool removably connected to the first tool-module frame, wherein the tool is capable of performing the operation, wherein the pressure unit comprises a set of rollers and at least one pressure foot, and wherein the reaction unit comprises a set of rollers;

moving the multi-axis carriage along the flexible vacuum rail to a location on the aircraft work piece;

contacting the surface of the aircraft work piece with the set of rollers of the pressure unit and the set of rollers of the reaction unit as the multi-axis carriage moves along the flexible vacuum rail;

applying a force against the surface with the pressure unit, wherein the pressure unit is rotatable around an axis parallel to an axis of movement of the multi-axis carriage and wherein the force is normal to the surface;

providing a reactive force to the force against the surface with the reaction unit; and performing the operation with the tool while the force and the reactive force are applied.

6. The method of claim 5, wherein the reaction unit is located on a second side of the tool module, opposite the first side, and wherein the method further comprises:

stabilizing the multi-axis carriage using the reaction unit during operation of the tool.

7. The method of claim 6, wherein stabilizing is performed using the set of rollers of the pressure unit and the set of rollers of the reaction unit while the multi-axis carriage moves along the flexible vacuum rail.

8. The method of claim 5, wherein the reaction unit further comprises a set of feet.

9. The method of claim 5, further comprising removing the tool from the first tool-module frame.

10. The method of claim 9 further comprising:
installing a second tool, different than the tool, on the first tool-module frame.

11. The method of claim 5, further comprising:
removing the tool module from the multi-axis carriage.

12. The method of claim 11 further comprising:
thereafter installing a second tool module to the multi-axis carriage, wherein the second tool module is different than the tool module.

13. The method of claim 12, wherein the second tool module has at least one of a different reaction unit design than the tool module, a different reaction unit design than the tool module, a different pressure unit design than the tool module, or a different tool design than the tool module.

14. The method of claim 5, wherein the surface is curved, the method further comprising:
moving the pressure unit about an axis parallel to an X-axis along which the multi-axis carriage moves when moving along the flexible vacuum rail in order to maintain contact between the set of rollers of the pressure unit and the surface; and
moving the reaction unit about a second axis parallel to the X-axis in order to maintain contact between the set of rollers of the reaction unit and the surface.

15. The method of claim 5, wherein the pressure unit further comprises a pressure foot car, the method further comprising:
maintaining an axis angularity of the pressure foot car using an elastomeric cushion.

16. The method of claim 5, wherein applying the force against the surface with the pressure unit comprises applying the force against the surface with the at least one pressure foot during the operation.

17. The method of claim 16, wherein the reaction unit further comprises at least one foot, and wherein providing the reactive force to the force against the surface with the reaction unit comprises applying the reactive force against the surface with the at least one foot during the operation.

18. The method of claim 5, wherein applying the force against the surface with the pressure unit further comprises applying the force against the surface with the set of rollers as the multi-axis carriage is moving along the flexible vacuum rail.

19. The method of claim 18, wherein applying the reactive force against the surface with the reaction unit comprises applying the reactive force with the set of rollers of the reaction unit as the multi-axis carriage is moving along the flexible vacuum rail.

* * * * *